United States Patent
Eyries et al.

(10) Patent No.: US 7,129,802 B2
(45) Date of Patent: Oct. 31, 2006

(54) METHOD FOR ESTIMATING A CARRIER LEAK, AN ESTIMATOR AND MODULATION SYSTEM PROVIDED WITH AUTOMATIC CONTROL OF A CARRIER USING SAID SYSTEM

(75) Inventors: Julien Eyries, Toulouse (FR); René Blaise, Eragny sur Oise (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/563,576

(22) PCT Filed: Jun. 25, 2004

(86) PCT No.: PCT/EP2004/051236

§ 371 (c)(1),
(2), (4) Date: Jan. 6, 2006

(87) PCT Pub. No.: WO2005/004427

PCT Pub. Date: Jan. 13, 2005

(65) Prior Publication Data

US 2006/0154637 A1    Jul. 13, 2006

(30) Foreign Application Priority Data

Jul. 8, 2003    (FR) .................................. 03 08339

(51) Int. Cl.
*H03C 3/00* (2006.01)
*H04L 27/12* (2006.01)

(52) U.S. Cl. ...................................... 332/100; 375/303

(58) Field of Classification Search ......... 332/100–102
See application file for complete search history.

(56) References Cited

U.S. PATENT DOCUMENTS

| 6,028,900 A | 2/2000 | Taura et al. |
| 6,760,300 B1 * | 7/2004 | Eberle et al. ............... 370/210 |
| 2002/0145969 A1 | 10/2002 | Zulfiquar |

FOREIGN PATENT DOCUMENTS

EP    0 689 313 A    12/1995

* cited by examiner

*Primary Examiner*—David Mis
(74) *Attorney, Agent, or Firm*—Lowe Hauptman & Berner LLP (57) ABSTRACT

The invention relates to a method of estimating a carrier leak making it possible to solve the accuracy degradation problem associated with a poor reception by the central carrier.

A subject of said invention is a method of estimating a carrier leak consisting in:
- varying a complex gain Z applied to the received signal s between at least two predetermined values Z1 and Z2;
- measuring the position (PD1, PD2) of the central carrier of the signal s demodulated for each applied gain (Z1, Z2);
- calculating at least a part of the carrier leak based on the measured positions (PD1, PD2) and the applied gains (Z1, Z2), the calculated carrier leak part (offset_mod) corresponding to the leak due to the modulator.

16 Claims, 5 Drawing Sheets

METHOD FOR ESTIMATING A CARRIER LEAK, AN ESTIMATOR AND MODULATION SYSTEM PROVIDED WITH AUTOMATIC CONTROL OF A CARRIER USING SAID SYSTEM

The invention relates to a method of estimating a carrier leak. In particular, this carrier leak estimation provides automatic control of the carrier when modulating and/or demodulating signals sent, for example, by broadcasting and communication systems.

The broadcasting and communication systems include a transmitter that modulates a signal before transmission and a receiver that demodulates the received signal. The modulator/demodulator pair must be stable and present an accuracy that is defined (even if it is stable) in order to obtain the required performance levels.

A growing number of applications in the broadcasting and communications field use OFDM. One of the possibilities of this technique is the use of the central carrier frequency as a pilot for the other carriers. In this case, the accuracy degradation can be associated with a poor rejection of the central carrier leak. Thus, the rejection quality can prove inadequate for some applications and/or some users.

As a general rule, this problem is known as the carrier leak problem. In practice, it also occurs in systems using a single central carrier frequency (e.g., 8-VSB modulation).

These days, in the context of DVB-T broadcasting systems, in those areas where the transmitters supply a signal with an insufficiently accurate carrier, some receivers may be in a mode that disregards the central carrier. This leads to a degradation of the signal in reception in terms of modulation error ratio (MER), and also bit error rate (BER).

In the case of the DVB-T standard, for example, which uses OFDM modulation, the broadcasters want to obtain at the transmitter output a modulation error ratio (MER) of at least 30 dB and a pre-Viterbi bit error rate (BER) of at least $10^{-5}$. Now, with a degraded central carrier, the modulation error ratio MER is often less than 30 dB and the bit error rate BER is greater than that required by the broadcasters, for example in the order of $10^{-3}$.

To enhance the carrier rejection quality, various solutions can be considered.

In particular, means of switching to intermediate frequency can be used. The problem is thus cancelled, but a number of tuners have to be used instead of just one. Furthermore, this method involves constraints at the filtering level because the signal is no longer in the baseband.

Another solution is to frequently adjust the modulators manually. This method requires powerful external measuring instruments such as modulation analyzers (for example, of the EFA™ type, a DVB-T modulation analyzer). Furthermore, this solution does not provide for rapid adaptation. Also, it requires the permanent presence of a qualified operator.

Another drawback of these solutions is that they are very expensive.

Another solution is the automatic control of a direct IQ modulation system by a direct demodulation system. In practice, a direct modulation system has a certain number of compensation commands or parameters for acting on carrier leak faults. Currently, the automatic control of a direct IQ modulation system by a direct demodulation system is limited to the intrinsic accuracy of the demodulator.

To solve the carrier leak problem, one solution currently used is the following. In a first step, the demodulator is calibrated by a particular test signal at the demodulator input. However, this step has a limit in terms of accuracy which stems from the fact that any change of the demodulator input signal in relation to the operating signal is reflected in an inaccuracy on this adjustment. In a second step, the signal between the system input and the return channel is measured. Here, too, accuracy is limited. This limitation stems from the following coder quality, measurement accuracy and signal processing parameters. In a third step, the central carrier leak is cancelled.

The rejection quality of the central carrier achieved with this method can still prove inadequate for certain applications and users. To enhance this system, the use of more powerful components can be envisaged (components having a stronger carrier rejection, having a better accuracy, etc.). However, the use of this type of components makes the solution very costly.

The present invention seeks to overcome these drawbacks by enabling the carrier leak to be estimated more accurately while retaining a method at reasonable cost.

A subject of the invention is a method of estimating a carrier leak, consisting in:
  varying a complex gain Z applied to the received signal s between at least two values Z1 and Z2;
  measuring the position (PD1, PD2) of the central carrier of the signal s demodulated for each applied gain (Z1, Z2);
  calculating at least a part of the carrier leak based on the measured positions PD1 and PD2 and the applied gains Z1 and Z2, the calculated carrier leak part (offset_mod) corresponding to the leak due to the modulator.

The invention further relates to a carrier leak estimator implementing the above estimation method and including:
  gain variation means (M1) for varying a complex gain Z applied to the received signal s between at least two predetermined values Z1 and Z2;
  measurement and calculation means (M2) for measuring the position (PD1, PD2) of the central carrier of the demodulated signal s for each applied gain (Z1, Z2) and calculating at least a part of the carrier leak based on the measured positions PD1 and PD2 and the applied gains Z1 and Z2, the calculated carrier leak part (offset_mod) corresponding to the leak due to the modulator.

Another subject of the invention is a modulation system with automatic control of the carrier including:
  a modulator receiving the signal to be modulated m and supplying the modulated signal s to be transmitted,
  a carrier leak estimator receiving the modulated signal s,
  a demodulator receiving the signal $S_z$ originating from the gain variation means M1 and supplying to the measurement and calculation means the demodulated signal d,
  carrier automatic control means for adding to the signal to be modulated m the carrier leak due to the modulator (offset_mod) supplied by the measurement and calculation means M2.

The features and advantages of the invention will become more clearly apparent from reading the description, given by way of example, and the related figures which represent.

Currently, the direct modulation systems implemented by IQ modulators suffer from certain defects originating from their implementation.

Typically, a direct modulation system has a certain number of compensation commands or parameters for acting on these defects. The automatic control of a direct IQ modulation system by a direct demodulation system is currently limited to the intrinsic accuracy of the demodulator.

Figure 1:
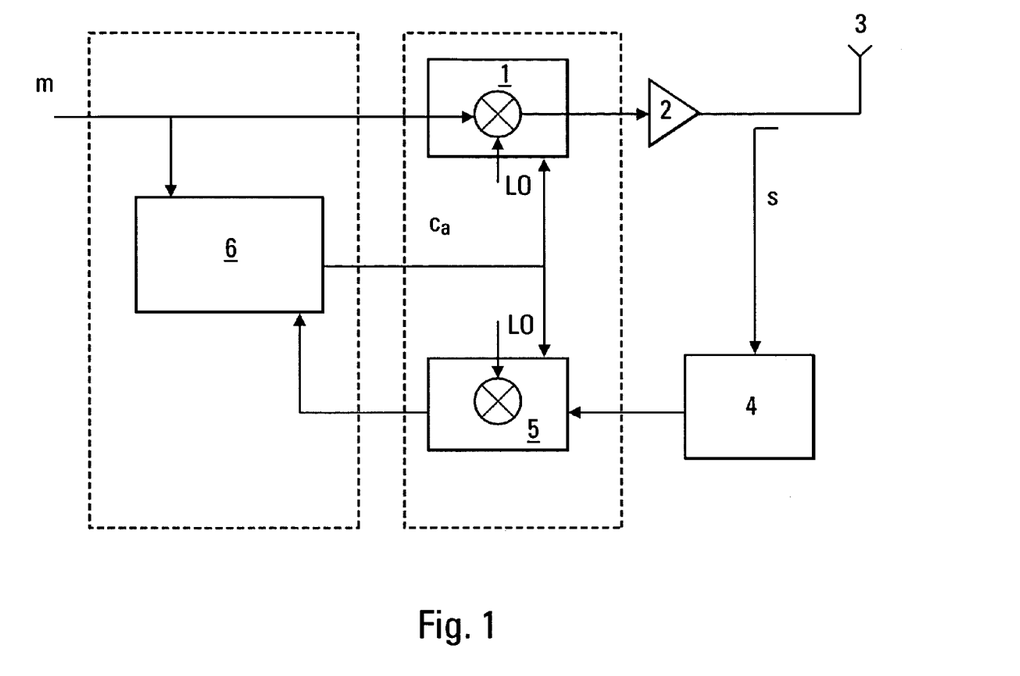
FIG. 1, a block diagram of an IQ modulation system with automatic control according to the state of the art, FIGS. 2a and 2b, the performance characteristics of the IQ modulation system with automatic control according to the state of the art, FIG. 2a representing the spectrum obtained at the output of the demodulator and FIG. 2b representing the modulation error ratio (MER), FIG. 3, a block diagram of an IQ modulation system with automatic control using the carrier leak estimator according to the invention, FIG. 4, a generic example of the gain variation means M1 of the carrier leak estimator according to the invention, FIG. 5, an example of implementation of the gain variation means M1 of the carrier leak estimator according to the invention, FIG. 6, a generic example of the measurement and calculation means M2 of the carrier leak estimator according to the invention, FIG. 7, an example of implementation of the measurement and calculation means M2 of the carrier leak estimator according to the invention for applications with non-zero central carrier, FIG. 8, a schematic diagram of the carrier automatic control means in the modulator, FIG. 9, a schematic diagram of the carrier automatic control means in the demodulator, FIGS. 10a and 10b, the performance characteristics, respectively in terms of bit error rate BER and modulation error ratio MER, of the IQ modulation system with automatic control according to the invention.

FIG. 1 represents a solution currently used to solve this carrier leak problem.

The signal to be modulated m is processed by the modulator 1 connected to an oscillator LO. The modulated signal m is amplified by an amplifier 2 before being sent to the RF (radiofrequency) output 3. In order to automatically control the modulator 1, the return signal s is processed by calibration means 4 before being demodulated to enable the automatic control means 6 receiving the demodulated signal d to control the modulator 1 and the IQ demodulator 5. The IQ demodulator 5 is connected to an oscillator LO supplying the same local frequency as to the modulator.

In a first step, the calibration means 4 send to the input of the demodulator 5 a particular test signal instead of the return signal s. The test signal is used to calibrate the demodulator 5. This step does, however, bring about an accuracy limitation. This accuracy limitation stems from the fact that any change of the demodulator input signal relative to the operating signal is reflected in an inaccuracy on this adjustment.

In a second step, the calibration means 4 transmit to the input of the demodulator 5 the return signal s. The automatic control means 6 measure the signal at the system input (before the modulator 1) and on the return channel at the output of the demodulator 5. This step also brings about an accuracy limitation. This accuracy limitation stems from a number of parameters and is in particular associated with the quality of the coder, the accuracy of the measurement, and the various signal processes. In particular, the measurement made at the input of the modulator 1 is used to take account of the carrier leak induced by the modulator but not that induced by the upstream processes (in particular, signal truncation errors).

In a third step, the automatic control means 6 cancel the central carrier leak, for example by injecting a voltage offset on the I and Q channels, this offset being dependent on the measurements of the second step.

The central carrier rejection quality achieved with this method proves inadequate for some applications and users.

Figure 2A:
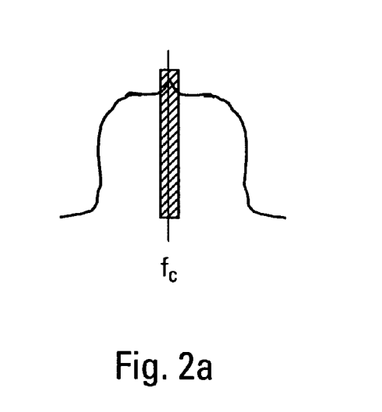

FIG. 2a shows the spectrum obtained at the output of the modulator when OFDM (Orthogonal Frequency Division Multiplexing) is used. In the shaded area around the central carrier frequency $f_c$, reception is poor quality because of the power peak appearing about this frequency.

Figure 2B:
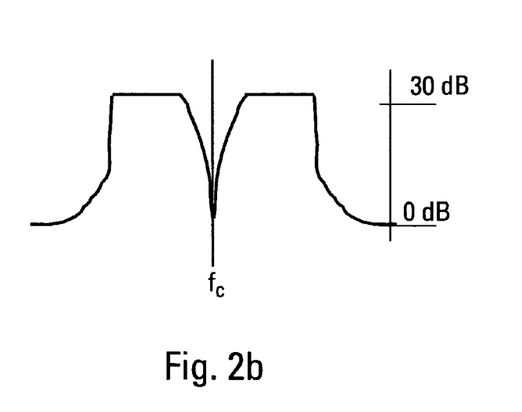

FIG. 2b shows the modulation error ratio MER. This ratio MER falls to 0 dB at the central carrier frequency $f_c$. Now, for applications such as digital television (DVB-T, for example), the ratio should be around at least 30 dB at the transmitter output. The duly obtained bit error rate at the transmitter output on the central carrier frequency $f_c$ is approximately $10^{-3}$ instead of the $10^{-5}$ needed for certain applications.

The faults affecting the central carrier can be modeled as follows:

The reference signal m has an equal direct current component with a position PA. PA is the theoretical position of the direct current component of the signal before modulation. This position PA is offset by the carrier leak offset_mod introduced by the modulator 1 to achieve the position PB. PB is therefore the position of the central carrier after modulation. It is this position that is obtained in the receivers after equalization of the transmission channel.

The modulated signal m is amplified by a complex gain Z between the modulator and the demodulator. In practice, all the gains of the transmission chain can be added at this point. The application of this gain Z offsets the central carrier frequency from the position PB to the position PC. Therefore, PC is the position of the central carrier after application of the gain Z.

The signal is then demodulated: the demodulator 5, by introducing a carrier leak offset_demod offsets the central carrier frequency from the position PC to the position PD. PD is the position noted on the return signal d.

Therefore, the position of the central carrier frequency of the signal at the output of the demodulator 5' according to the theoretical position of the direct current component of the signal before modulation can be written as follows:

$$PD=\text{offset\_demod}+Z^*(\text{offset\_mod}+PA)$$

This system has three unknowns: offset_demod, offset_mod, Z. Also, the theoretical position of the direct current component of the signal PA is a system constant, defined by the nature of the signal:

PA=0 for 8-VSB modulation (ATSC standard), for analog TV modulations (PAL/SECAM/NTSC standards)

PA≠0 for OFDM modulation (DVB-T standard). For example, PA=−4/3 in DVB-T.

Figure 3:
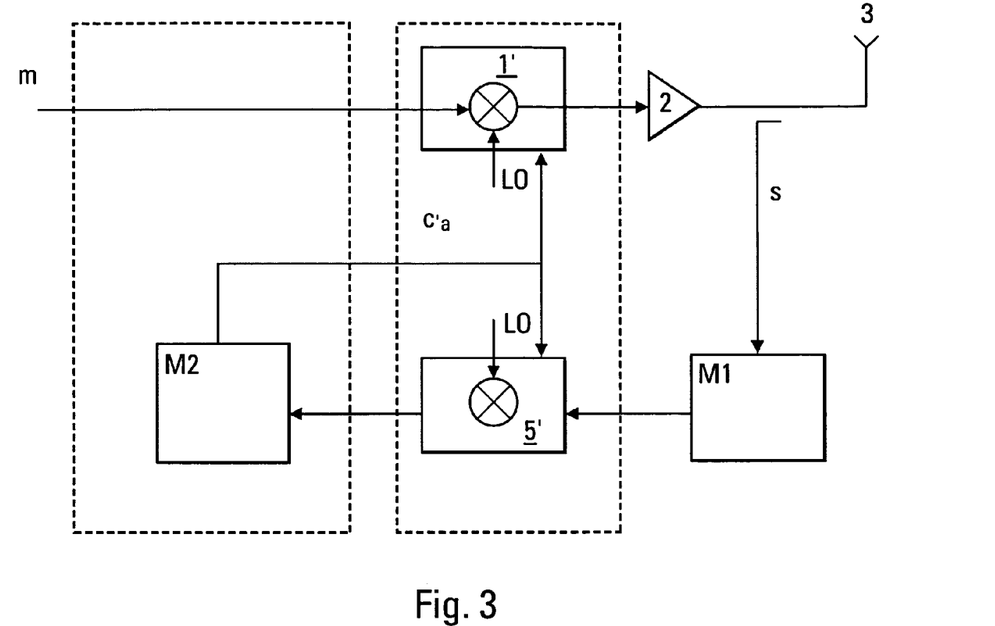

FIG. 3 shows a block diagram of the carrier frequency automatic control system according to the invention for determining the carrier leak offset_mod induced by the modulator 1', and the carrier leak offset_demod induced by the demodulator 5'.

The method implemented by this system is to deliberately vary the characteristics of the complex gain Z of the return channel, in order to separate the offset_mod contribution of the modulator from the offset_demod contribution of the demodulator at the level of the offset measured on the return signal.

In the case where the position of the central carrier frequency is non-zero PA≠0, this method also includes the estimation on the basis of the return signal of the complex gain Z applied to the signal and the position of the central carrier relative to its theoretical position.

The signal m is supplied to the modulator 1' which supplies a modulated signal m to the amplifier 2. The signal obtained s is sent to the RF output 3. The signal s is the signal incoming on the return channel of the carrier automatic control system.

According to the first point of the method explained above, complex gain variation means M1 receive the signal s. These gain variation means supply a signal sZ corresponding to the return signal s to which a given gain Z has been applied.

Figure 4:
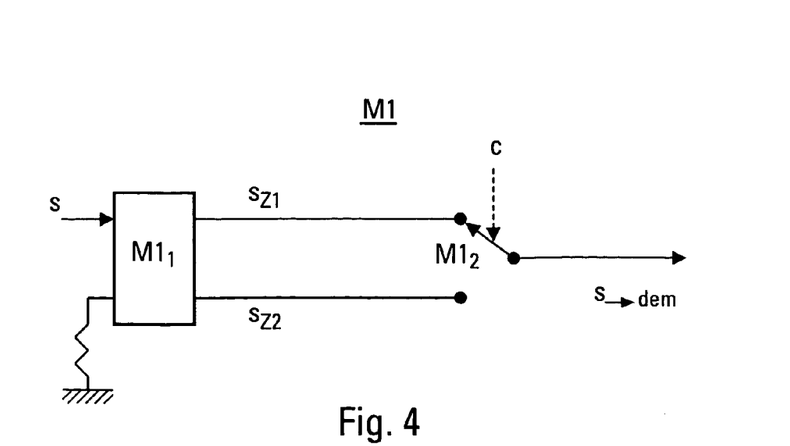

FIG. 4 shows a generic diagram of the complex gain variation means M1. The complex gain variation means M1 include complex gain application means $M1_1$ applying different complex gains Z1, Z2 to the return channel s, followed by selection means $M1_2$ for selecting the return signal $s_{\to dem} = s_z = s_{z1}$ or $s_{z2}$ corresponding, respectively, to the gain Z1 or Z2 according to a control signal c.

The gain Z1 can be applied at a given instant (t1) and for a predetermined period T1, and the complex gain Z2 can be applied at a given instant t2 and for a predetermined period T2.

Figure 5:
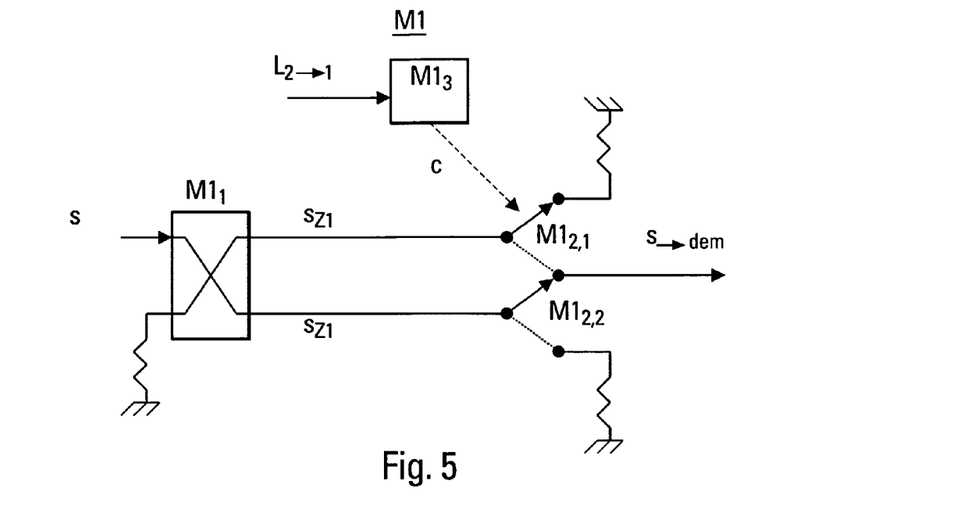

A possible implementation of the complex gain variation means M1 is shown in FIG. 5. The complex gain variation means M1 include two UHF relays and a 0°–90° UHF coupler, placed on the return path. The 0°–90° coupler constitutes complex on the second output is equal to $Z2=Z1 \cdot e^{j\pi\phi/180}$, with $\phi$ close to 90°.

In another possible embodiment of the complex gain variation means M1, the gains Z1 and Z2 can be such that Z2=−Z1. The coupler $M1_1$ of the complex gain variation means M1 can thus be replaced by a transformer or an amplifier in order to obtain such a phase shift of 180°.

Other phase shifts can be obtained, by using an electrical length as the gain application means $M1_1$ for obtaining the required phase shift.

A length $L_{2\to 1}$, for example an RS232 type link, between the measurement and calculation means and the gain variation means M1 can be used to choose to connect to the M1 output either the 0° output of the coupler or the 90° output of the coupler: $s_{\to dem} = s_z = s_{z1}$ or $s_{tz1}$. In particular, as is shown in FIG. 4, this link $L_{2\to 1}$ can control the relays that constitute the selection means $M1_1$.

In another embodiment of M1, the relays $M1_2$ can be replaced by switches in combination with any one of the embodiments of the gain application means $M1_1$.

The signal $s_z$ obtained by the gain variation means M1 is supplied to the demodulator 5' using the same local frequency as the demodulator 1'.

Figure 6:
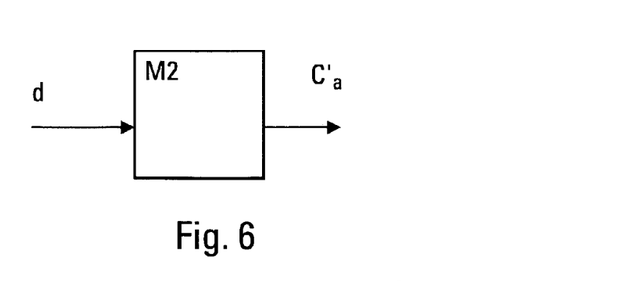

In accordance with the second point of the method explained above, the measurement and calculation means M2 estimates the complex gain Z applied. As is shown in FIG. 6, these measurement and calculation means M2 receive the demodulated return signal d ($=d_{z1}$ or $d_{z2}$ according to the gain applied) and supply the automatic control commands to the modulator 1' in order to suppress the carrier leak introduced by the modulator.

The method implemented by the measurement and calculation means M2 includes:
 measuring the positions PD1 and PD2 of the central carrier of the demodulated signal for each applied gain, respectively $d_{z1}$ and $d_{z2}$; and
 calculating the carrier leak part (offset_mod) corresponding to the leak due to the modulator based on the measured positions PD1 and PD2 and the applied gains Z1 and Z2.

This estimation method can allow for another part of the carrier leak to be calculated on the basis of the measured positions PD1 and PD2 and the applied gains Z1 and Z2. This other part of the calculated carrier leak corresponds to the leak due to the demodulator (offset_demod). As is shown in FIG. 3, the measurement and calculation means M2 can thus supply automatic control commands $c'_a$ also to the demodulator 5' in order to suppress the carrier leak introduced by the demodulator.

According to the modulation type, the measurement and calculation means M2 can be produced in various ways to implement this carrier leak estimation method.

In a first variant, particularly suited to modulations in which the central carrier is zero (PA=0), such as, for example, 8-VSB, the measurement and calculation means M2a can include a measurement device. The measurement device notes the positions PD1 and PD2 of the central carrier at the output of the demodulator for each of the respective gains Z1 and Z2. The measurement and the calculation means M2 then minimizes the difference between the two measured positions ||PD2−PD1|| to obtain the automatic control command c'a making the carrier leak offset_mod due to the modulator converge towards zero.

In practice, since the measurement and calculation means M2a are suited to modulations for which PA=0 (for example 8-VSB), the equation for the position PD of the central carrier frequency of the signal at the output of the demodulator 5' according to the theoretical position PA of the DC component of the signal before modulation is simplified:

PD=offset_demod+Z*offset_mod

Therefore, in order to cancel the carrier leak offset_mod due to the modulator 1', the measurement and calculation means M2 then performs a search for the automatic control parameters c'a that minimize the term ||PD2−PD||, because PD1=offset_demod+Z1*offset_mod and PD2=offset_demod+Z2*offset_mod, therefore offset_mod=(PD2−PD1)/(Z2−Z1), hence ||offset_mod||=K*||PD2−PD1||, with K=1/||Z2−Z1|| is a strictly positive constant dependent only on Z1 and Z2.

This search for the minimum can be performed by various methods of the "gradient" type, among others.

In a second variant, particularly suited to modulations in which the central carrier is non-zero (PA$^1$0), such as, for example, OFDM, the measurement and calculation means M2b can include a measurement device. The measurement device notes the positions PD1 and PD2 of the central carrier at the output of the demodulator for each of the respective gains Z1 and Z2.

Compared to the solution added for the case of the zero central carrier position PA=0, the measurement and calculation means M2b of this second variant includes means for separating the values of offset_mod and PA from the PD1 and PD2 measurements.

To this end, the measurement and calculation means M2b measures the complex gain Z applied on the basis of the demodulated signal d.

Figure 7:
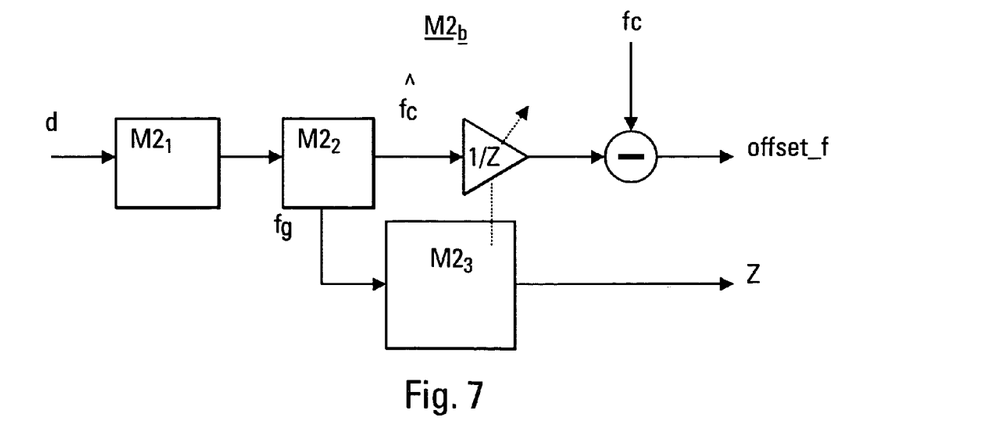

In the example illustrated by FIG. 7, the measurement and calculation means M2b can include a simplified OFDM demodulator which is used to measure the complex gain Z applied to an OFDM signal as is shown in FIG. 7. The simplified demodulator includes synchronization means $M2_1$ receiving the demodulated signal d, Fourier transform means $M2_2$ (for example of FFT, Fast Fourier Transform, type) connected to the output of the synchronization means $M2_1$ and supplying the central carrier of the return channel $f_c$ and the pilot carriers $f_g$. The gain Z is then estimated by gain estimation means $M2_3$ based on the pilot carriers of the demodulated signal d.

The measurement and calculation means M2b, knowing the value of Z applied, then apply a gain of 1/Z to the position of the measured central carrier PD, in our example, by the Fourier transform means $M2_2$. This is used to obtain the position PF of the central carrier corresponding to:

$$PF = PA + \text{offset\_mod} + \text{offset\_demod} \ast (1/Z)$$

Then, the measurement and calculation means M2b perform a difference operation between the duly obtained value and the theoretical central carrier PA (for example, PA=−4/3 in DVB-T) to obtain the relative offset of the central carrier relative to the theoretical position in the constellation for each value of Z: offset_f1 and offset_f2.

$$\text{offset\_}f = PF - PA = \text{offset\_mod} + \text{offset\_demod} \ast (1/Z)$$

The measurement and calculation means M2b then performs the operation $$\text{offset\_f1} - \frac{1}{Z1} \frac{(\text{offset\_f2} - \text{offset\_f1})}{((1/Z2) - 1/Z1))}$$

to obtain the part of the carrier leak due to the modulator (offset-mod). Furthermore, the measurement and calculation means M2b can perform the operation to obtain the carrier leak part due to the demodulator (offset_dem).

The maximum accuracy for calculating carrier leaks offset_mod and offset_dem is obtained in the particular case Z2=−Z1, which corresponds to a phase shift of 180°. As a general rule, it is recommended in producing M1 to take a fairly high phase shift between Z1 and Z2.

The measurement and calculation means M2b then looks for the automatic control parameters $c'_a$ making the variables offset_mod and offset_demod converge towards zero to apply the automatic control of the carrier.

Figure 8:
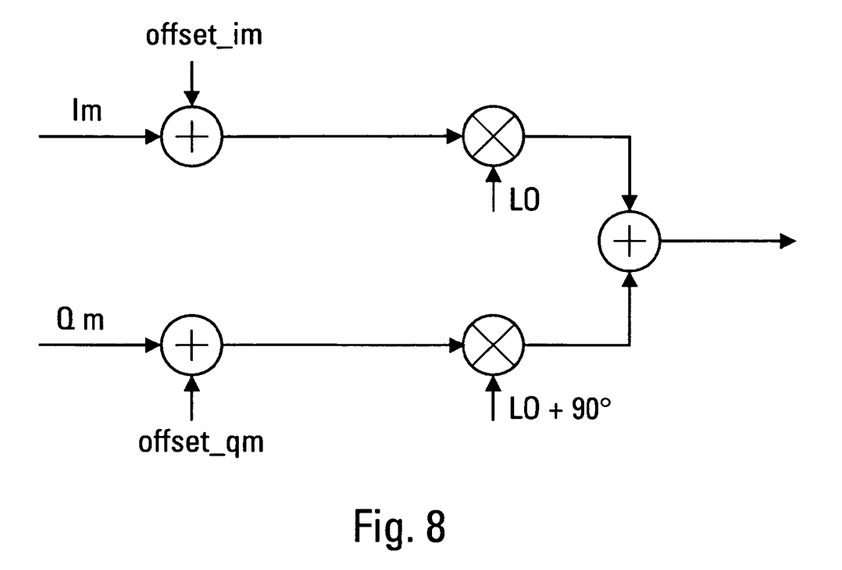
Figure 9:
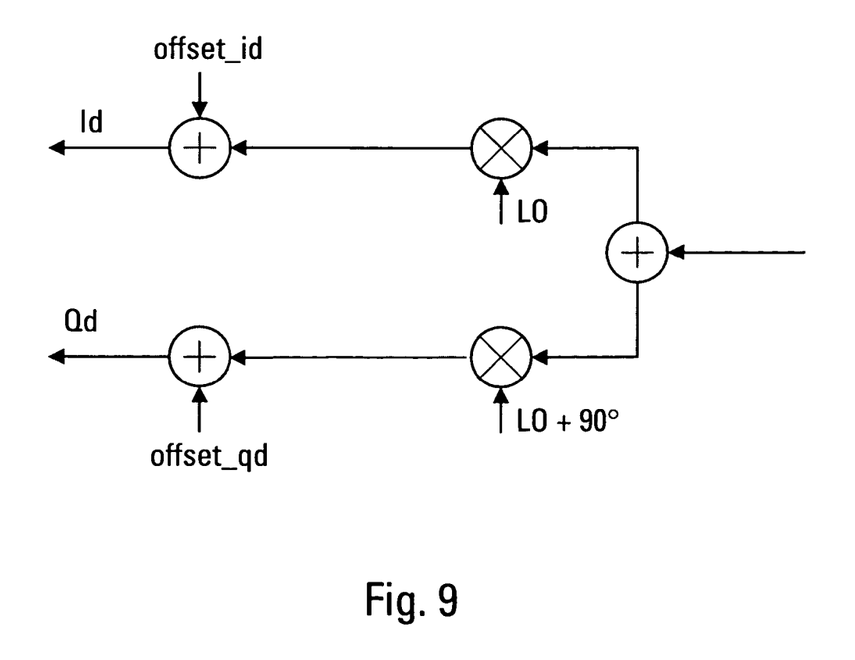

FIGS. 8 and 9 propose schematic diagrams describing an embodiment of automatic control, respectively of an IQ modulator and an of IQ demodulator.

The IQ modulator 1' of FIG. 8 receives the signal to be modulated m in the form of two signals in quadrature $I_m$ and $Q_m$: $m = I_m + iQ_m$, and the automatic control parameters $c'_a$ which correspond in this case to the estimation of the carrier leak introduced by the modulator offset_mod, these also in the form of two signals in quadrature offset_im and offset_qm: offset_mod=−offset_im−i offset_qm. The signal to be modulated m and the automatic control parameters are added respectively in phase and in quadrature before being modulated by the local frequency LO.

In the same way, the IQ demodulator 5' of FIG. 9 receives the signal to be demodulated s in the form of two signals in quadrature, and the automatic control parameters c'a which correspond in this case to the estimation of the carrier leak introduced by the modulator offset_dem, these also in the form of two signals in quadrature offset_id and offset_qd: offset_demod=−offset_id−i offset_qd. The signal to be demodulated d is demodulated by the local frequency LO before being added with the automatic control parameters respectively in phase and in quadrature, to obtain the compelled demodulated signal d=Id_iQd.

Thus, to make offset_mod converge, the automatic control parameters of the modulator (offset_im and offset_qm) are adjusted, and to make offset_demod converge, the automatic control parameters of the demodulator (offset_id and offset_qd) are adjusted.

Figure 10A:
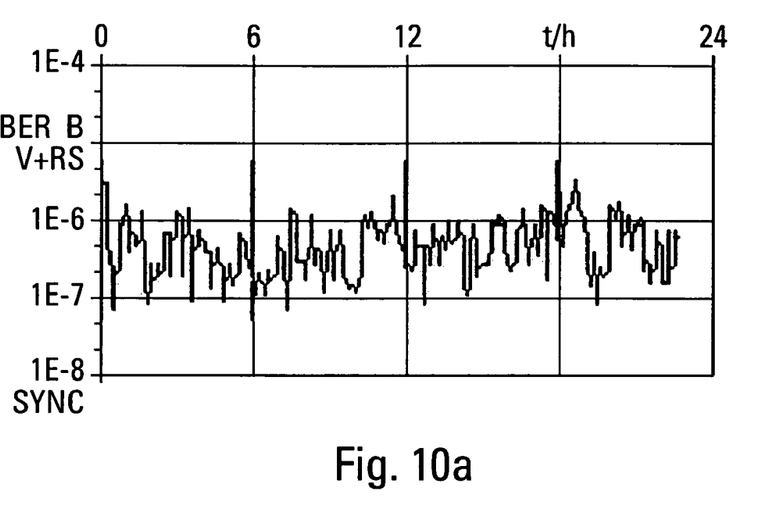

FIG. 10a shows the performance characteristics in terms of bit error rate BER obtained using the IQ modulation system with automatic control according to the invention. In the example illustrated by FIG. 10a, the bit error rate has ranged, over 24 hours, on average between $10^{-6}$ and $10^{-7}$, i.e. below the $10^{-5}$ required by radio-broadcasters.

Figure 10B:
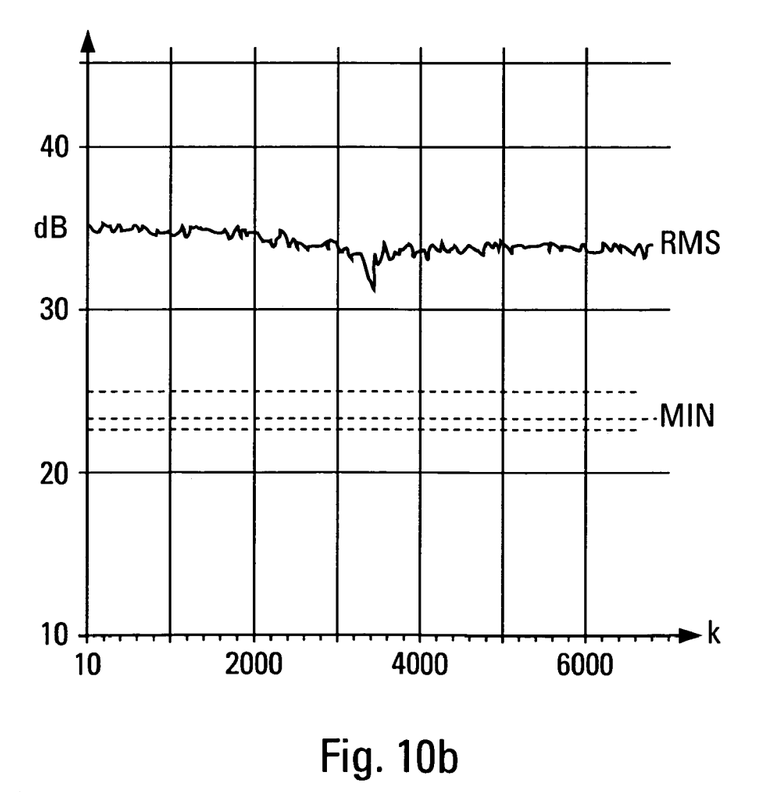

FIG. 10b shows the performance characteristics in terms of modulation error ratio MER obtained using the IQ modulation system with automatic control according to the invention. The modulation error ratio MER obtained is approximately 35 dB whatever the frequency, except about the frequency where it is slightly less. However, this MER ratio remains greater than 30 dB as required by the radio-broadcasters.

This carrier leak estimation method according to the invention can be implemented by all devices and/or in all applications requiring an accurate estimation of the carrier leak in order to prevent a degradation of its performance.

The invention claimed is:

1. A method of estimating a carrier leak, comprising the steps of:
varying a complex gain Z applied to the received signal s between at least two values Z1 and Z2;
measuring the position of the central carrier of the signal demodulated for each applied gain;
calculating a part of the carrier leak based on the measured positions and the applied gains, the calculated carrier leak part corresponding to the leak due to the modulator.

2. The estimation method as claimed in claim 1, wherein the gain is applied at a given instant and for a predetermined period and the complex gain is applied at a given instant and for a predetermined period.

3. The estimation method as claimed in claim 1, wherein each of the gains is equal.

4. The estimation method as claimed in claim 1, wherein another part of the carrier leak calculated on the basis of the measured positions and the applied gains corresponds to the leak due to the demodulator.

5. The estimation method as claimed in claim 1, wherein the calculation of at least a part of the carrier leak includes the minimizing of the difference between the two measured positions.

6. The estimation method as claimed in claim 5, wherein the minimizing is performed by a gradient type method.

7. The estimation method as claimed in claim 1, wherein the calculation of the carrier leak comprises:
measuring the gain Z on the basis of the demodulated signal,
applying to the measured position a gain 1/Z before the carrier position measurement and
the difference between the duly obtained value and the theoretical central carrier being used to obtain an estimation of the carrier leak for each value of Z (offset_f1 and offset_f2), and
the operation $$\text{offset\_f1} - \frac{1}{Z1} \frac{(\text{offset\_f2} - \text{offset\_f1})}{((1/Z2) - 1/Z1))}$$

being used to obtain the part of the carrier leak due to the modulator (offset-mod).

8. The estimation method as claimed in claim 7, wherein the calculation of at least a part of the carrier leak includes the operation $$\frac{(\text{offset\_f2} - \text{offset\_f1})}{((1/Z2) - 1/Z1))}$$

used to obtain the part of the carrier leak due to the demodulator (offset_dem).

9. A carrier leak estimator implementing the estimation method as claimed in claim 1, including:
 gain variation means for varying a complex gain Z applied to the received signal s between at least two predetermined values;
 measurement and calculation means for measuring the position of the central carrier of the demodulated signal s for each applied gain and calculating at least a part of the carrier leak based on the measured positions and the applied gains, the calculated carrier leak part corresponding to the leak due to the modulator.

10. The estimator as claimed in claim 9, wherein it includes a link between the gain variation means and the measurement and calculation means enabling the measurement and calculation means to chose the gain applied by the gain variation means.

11. The estimator as claimed in claim 10, wherein the gain variation means include two UHF relays or two switches: the first receiving the signal s to which the gain Z1 has been applied, the second receiving the signal s to which the gain Z2 has been applied, the relay corresponding to the gain chosen by the measurement and calculation means being linked to the output of the gain variation means.

12. The estimator as claimed in claim 10, wherein the means of applying the gains includes:
 a 0°–90° coupler receiving the modulated signal s and transmitting this signal s to its 0° output (Z1) and the signal s phase shifted by 90° to its 90° output, or
 a transformer or an amplifier receiving the modulated signal s and transmitting this signal s, and the signal s phase shifted by 180°, or
 an electrical length l receiving the modulated signal s and transmitting this signal s, and the signal s phase shifted by φ dependent on l.

13. A modulation system with automatic control of the carrier including a modulator receiving the signal to be modulated m and supplying the modulated signal s to be transmitted, including:
 an estimator as claimed in claim 9 receiving the modulated signal,
 a demodulator receiving the signal originating from the gain variation means and supplying to the measurement and calculation means the demodulated signal,
 carrier automatic control means for adding to the signal to be modulated m the carrier leak due to the modulator supplied by the measurement and calculation means M2.

14. The modulation system as claimed in claim 13, wherein the carrier automatic control means can also be used to add to the demodulated signal d the carrier leak due to the demodulator supplied by the measurement and calculation means before supplying the corrected demodulated signal to the measurement and calculation means.

15. The use of the estimation method as claimed in claim 1 for a modulation with zero central carrier.

16. The use of the estimation method as claimed in claim 1 for a modulation with non-zero central carrier.

* * * * *